(12) United States Patent
Berringer

(10) Patent No.: US 6,949,900 B1
(45) Date of Patent: Sep. 27, 2005

(54) MCU CONTROL FOR BRUSHLESS DC MOTOR

(75) Inventor: Kenneth Alan Berringer, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 0 days.

(21) Appl. No.: 10/881,210

(22) Filed: Jun. 30, 2004

(51) Int. Cl.[7] ............................................. H02P 7/06
(52) U.S. Cl. ................. 318/254; 318/138; 318/439; 318/600; 318/601; 318/609; 388/828; 388/833; 388/834; 388/838
(58) Field of Search ..................... 318/254, 138, 318/439, 600, 601, 609; 388/828, 833, 834, 388/838

(56) References Cited

U.S. PATENT DOCUMENTS

| | | | | |
|---|---|---|---|---|
| 5,569,994 A | * | 10/1996 | Taylor et al. ............... | 318/700 |
| 5,990,643 A | * | 11/1999 | Holling et al. .............. | 318/254 |
| 6,323,609 B1 | * | 11/2001 | Lopez ......................... | 318/254 |
| 6,441,572 B2 | * | 8/2002 | Batzel ......................... | 318/254 |
| 6,555,977 B1 | * | 4/2003 | Du et al. ..................... | 318/254 |
| 6,762,575 B2 | * | 7/2004 | Douglas ...................... | 318/254 |
| 2004/0000885 A1 | * | 1/2004 | Shao ........................... | 318/254 |

* cited by examiner

Primary Examiner—Rita Leykin
(74) Attorney, Agent, or Firm—Howison & Arnott, L.L.P.

(57) ABSTRACT

A processor for controlling a sensorless, brushless DC motor is disclosed comprising a first output for providing a control signal to a potentiometer controlling the speed and voltage of the DC motor. The processor also includes a second input for receiving a back-EMF voltage from an open phase of a three phase winding. The processor determines a digital error signal from the back-EMF voltage and generates a control signal responsive to the digital error signal. The control signal decreases the speed of the motor when the digital error signal is in a first range. The processor decreases both the speed and voltage of the motor when the digital error signal is in a second range. The processor increases the speed of the motor when the digital error signal is in a third range. The processor increases both the speed and voltage of the motor when the digital error signal is in a fourth range.

27 Claims, 6 Drawing Sheets

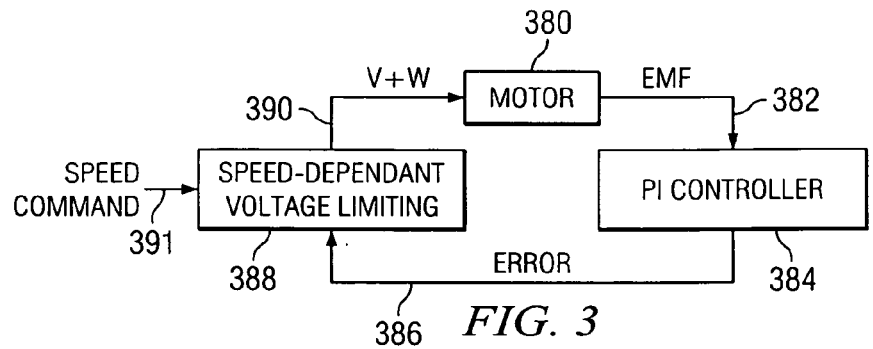
*FIG. 3*
|   | TOP | | | BOTTOM | | | OPEN PHASE |
|---|---|---|---|---|---|---|---|
|   | A | B | C | A | B | C |   |
| 0 |   | PWM |   | PWM |   |   | C |
| 1 |   |   | PWM | PWM |   |   | B |
| 2 |   |   | PWM |   | PWM |   | A |
| 3 | PWM |   |   |   | PWM |   | C |
| 4 | PWM |   |   |   |   | PWM | B |
| 5 |   | PWM |   |   |   | PWM | A |
*FIG. 4*
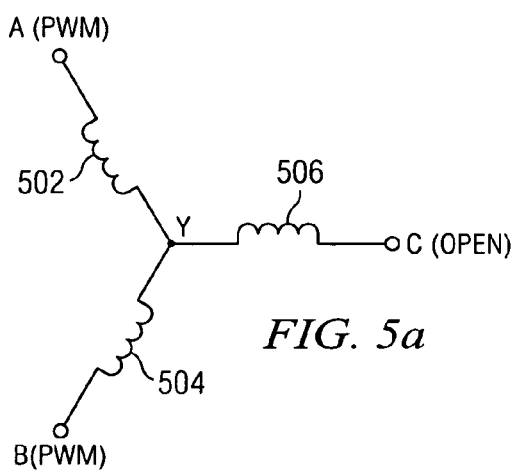
*FIG. 5a*

MCU CONTROL FOR BRUSHLESS DC MOTOR

TECHNICAL FIELD OF THE INVENTION

The present invention relates to sensorless and brushless DC motors, and more particularly, to a method for controlling a sensorless and brushless DC motor using a single MCU based control loop.

BACKGROUND OF THE INVENTION

Brushless DC motors consist of a permanent magnet rotor with a three phase stator winding. Brushless DC motors evolved from conventional DC motors where the function of the brushes is replaced by electronics. Brushless DC motors offer longer life and less maintenance than conventional brush DC motors. Most brushless DC motor designs use Hall-Effect sensors to measure the position of the rotor. Hall-Effect sensors provide the absolute position information required to commutate the motor. Using Hall-Effect sensors provides simple, robust commutation and performance roughly comparable to a brushed DC motor. One of the major barriers limiting the market penetration of brushless DC motors has been the cost of the Hall-Effect sensors in brushless DC motors. The Hall-Effect sensors themselves are not particularly expensive. However, the Hall-Effect assembly adds significant expense to the cost of manufacturing the motor. Hall-Effect transistors also typically require five additional wires which add to the installation costs.

A sensorless, brushless DC motor does not have Hall-Effect sensors. Sensorless, brushless DC motors employ more sophisticated electronics using an alternative scheme to control the commutation of the motor. The most common scheme involves measuring the back-EMF of the motor and using this information to control the commutation of the motor. Most existing control loops for sensorless, brushless DC motors comprise analog control loops for controlling the motor. These analog control loops are not particularly effective at maintaining operation of the sensorless, brushless DC motor within a safe region of operation of the DC motor. When the DC motor operates outside of its safe region, there is a high likelihood of damage to the electronic components of the DC motor. Therefore, there is a need for an improved control system for sensorless, brushless DC motors that enables more efficient control of the DC motor and helps in maintaining operation of the DC motor within a designated safe zone.

SUMMARY OF THE INVENTION

The present invention disclosed and claimed herein, in one aspect thereof, comprises a processor for controlling a sensorless, brushless DC motor. The processor includes a first output for providing a control signal to a potentiometer that controls the speed and voltage of the DC motor. A first input of the processor receives a back-EMF voltage from an open phase of a three phase winding. The processor is able to determine a digital error signal from the back-EMF voltage and generate a control signal responsive to this digital error signal. The control signal decreases the speed of the motor when the digital error signal is in a first range and decreases both the speed and voltage when the digital error signal is in a second range. Likewise, the processor increases the speed of the motor when the digital error is in the third range and increases both the speed and voltage when the digital error signal is in a fourth range.

BRIEF DESCRIPTION OF THE DRAWINGS

For a more complete understanding of the present invention and the advantages thereof, reference is now made to the following description taken in conjunction with the accompanying Drawings in which:

FIG. 3 illustrates the single control loop for controlling the operation of a sensorless, brushless DC motor;

FIG. 4 is a table illustrating the manner in which PWM signals may be applied to two phases of a winding of the three-phase motor in order to enable measurement of the back-EMF voltage from the open phase winding;

FIG. 5a is a block diagram of the three-phase winding of a sensorless, brushless DC motor;

DETAILED DESCRIPTION OF THE INVENTION

Figure 1:
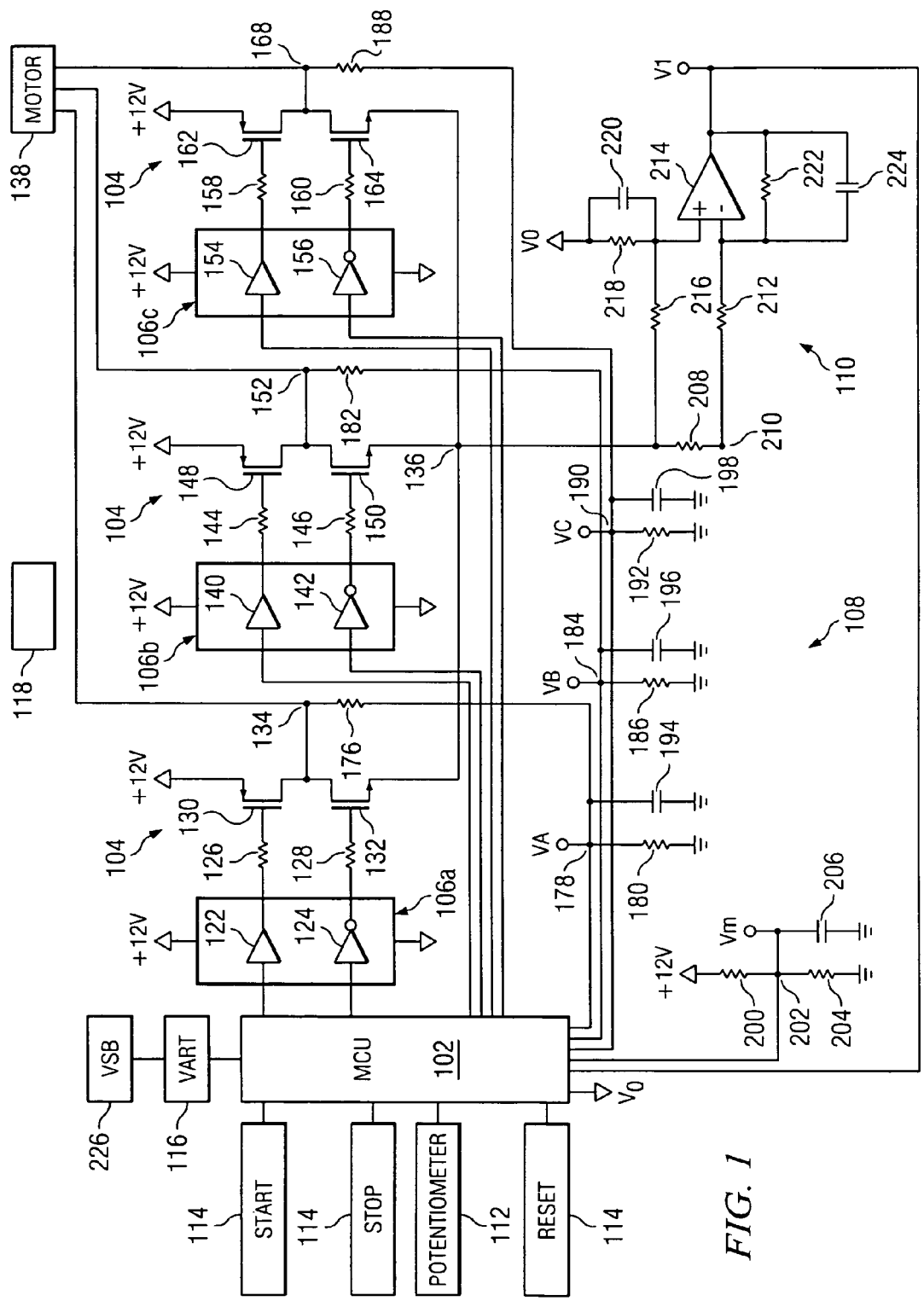
FIG. 1 is a schematic diagram of a sensorless, brushless DC motor.

Referring now to the drawings, and more particularly to FIG. 1, there is illustrated a schematic diagram of a sensorless, brushless DC motor according to the present disclosure. Sensorless, brushless DC motors may be utilized in a number of devices. For example, most computer hard disk drives use a sensorless, brushless DC motor. However, these small motor drives use a linear regulator to control the voltage applied to the motor. While this solution works well for small motors, it is inefficient to use for motors of greater than a few watts. Larger motors require PWM control for efficient operation. Using PWM control makes the task of measuring the back-EMF of the motor more difficult.

Sensorless, brushless DC motors are well suited for fans and rotary pumps from a few watts up to about 1 kW. Fans and pump loads are predictable and fairly well behaved. Most sensorless, brushless DC motors do not provide the same level of dynamic speed control available from Hall-Effect controlled brushless DC motors or DC motors. While it is theoretically possible to achieve high performance from a sensorless, brushless DC motor using sophisticated vector control, most practical sensorless, brushless DC motor implementations address the much simpler fan and pump applications.

The sensorless, brushless DC motor consists of a micro controller unit (MCU) 102, a three-phase power MOSFET bridge 104, three dual gate drivers 106, sense voltage resistor dividers 108, current amplifier 110, speed control potentiometer 112, two function switches 114, USB-UART bridge 116 and a voltage regulator 118. The micro controller unit 102 is connected to the inputs of dual gate drivers 106 via lines 120. Dual gate driver 106a consists of a first amplifier 122 and an inverted amplifier 124 having their inputs connected to the micro controller unit 102 by one of the connection lines 120. The outputs of the amplifier 122 and inverted amplifier 124 are connected to a first end of resistors 126 and 128, respectively. The second end of the resistor 126 is connected to the gate of a P-channel MOSFET 130. The second end of resistor 128 is connected to the gate of an N-channel MOSFET 132. The source-drain path of transistor 130 is connected between a +12V voltage source and node 134. The drain-source path of transistor 132 is connected between node 134 and node 136. Node 134 is further connected to a first terminal of the DC motor 138. Transistor 130 comprises the bottom transistor for phase A of the three phase winding and transistor 132 comprises the top transistor for phase A of the three phase winding.

A next dual gate driver 106b consists of a first amplifier 140 and an inverted amplifier 142 having their inputs connected to the micro controller unit 102 by one of the connection lines 120. The outputs of the amplifier 140 and inverted amplifier 142 are connected to a first end of resistors 144 and 146, respectively. The second end of the resistor 144 is connected to the gate of a P-channel MOSFET 148. The second end of resistor 146 is connected to the gate of an N-channel MOSFET 150. The source-drain path of transistor 148 is connected between a +12V voltage source and node 152. The drain-source path of transistor 150 is connected between node 152 and node 136. Node 152 is further connected to a second terminal of the DC motor 138. Transistor 148 comprises the bottom transistor for phase B of the three phase winding and transistor 150 comprises the top transistor for phase B of the three phase winding.

The third dual gate driver 106c consists of a first amplifier 154 and an inverted amplifier 156 having their inputs connected to the micro controller unit 102 by one of the connection lines 120. The outputs of the amplifier 154 and inverted amplifier 156 are connected to a first end of resistors 158 and 160, respectively. The second end of the resistor 158 is connected to the gate of a P-channel MOSFET 162. The second end of resistor 160 is connected to the gate of an N-channel MOSFET 164. The source-drain path of transistor 162 is connected between a +12V voltage source and node 166. The drain-source path of transistor 164 is connected between node 166 and node 136. Node 166 is further connected to a third terminal of the DC motor 138. Transistor 162 comprises the bottom transistor for phase C of the three phase winding and transistor 164 comprises the top transistor for phase C of the three phase winding.

The output ports of the MCU 102 connected to lines 120 are configured as push-pull outputs. The port pins connected to lines 120 are sequenced, alternating between bottom and top starting with phase A in the least significant bit. This sequence facilitates commutation using a simple pattern with the crossbar pin skip register included within the MCU 102.

Each of the three output phases are connected to a simple resistor divider 108. The resistor divider for phase A, consisting of transistors 130 and 132, comprise resistor 176 connected between node 134 and node 178 and resistor 180 connected between node 178 and ground. The resistor divider for the B phase output, consisting of transistor 148 and transistor 150, comprises resistor 182 connected between node 152 and node 184 and resistor 186 connected between node 184 and ground. The resistor divider for the C phase, consisting of transistor 162 and transistor 164, consists of resistor 188 connected between node 166 and node 190 and resistor 192 connected between node 190 and ground. The resistor divider 108 divides the phase output voltage of each phase voltage by six. This ratio permits accurate A/D converter measurement up to 19.8V. A capacitor is placed across the lower resistor of each resistor divider 108 to form single-pole low-pass RC filters. Thus, capacitor 194 is located between node 178 and ground in parallel with resistor 180. Capacitor 196 is located between node 184 and ground in parallel with resistor 186, and capacitor 198 is located between node 190 and ground in parallel with resistor 192. Each RC filter is tuned approximately one decade below the PWM frequency. Three test points are provided for the scaled voltages labeled VA, VB and VC.

A fourth resistor divider consists of resistor 200 between +12V and a node 202 connected to the micro controller unit 102, and a resistor 204 connected between node 202 and ground. A capacitor 206 connected between node 202 and ground is parallel to resistor 204. This resistor divider is used to sense the voltage of the motor supply and has a ratio of 1/12 or half of the phase voltage dividers. A test point is provided on the scaled motor supply voltage labeled VM.

The current amplifier 110 includes a current sense resistor 208 connected between node 136 and node 210. A resistor 212 is connected between node 210 and the inverting input of current amplifier 214. A resistor 216 is connected between node 136 and the non-inverting input of current amplifier 214. Another resistor 218 is connected between V0 and the non-inverting input of current amplifier 214, and a capacitor 220 is connected between V0 and the non-inverting input of current amplifier 214. A parallel combination of resistor 222 and capacitor 224 are connected between the output of current amplifier 214 and the inverting input of current amplifier 214.

The USB-UART bridge 116 is connected between the micro controller unit 102 and a USB port 226 and acts as an interface therebetween. The USB-UART bridge 116 is used in the place of an RS232 transceiver chip. The MCU 102 communicates with the USB-UART bridge 116 using conventional asynchronous serial data.

The speed control potentiometer 112 provides the manner in which the MCU 102 may control both the speed ω of the sensorless, brushless DC motor and the voltage of the sensorless, brushless DC motor. A pair of switches 114 comprise the start switch 114a and the stop switch 114b which may be manually actuated to both start and stop the sensorless, brushless DC motor.

Figure 2:
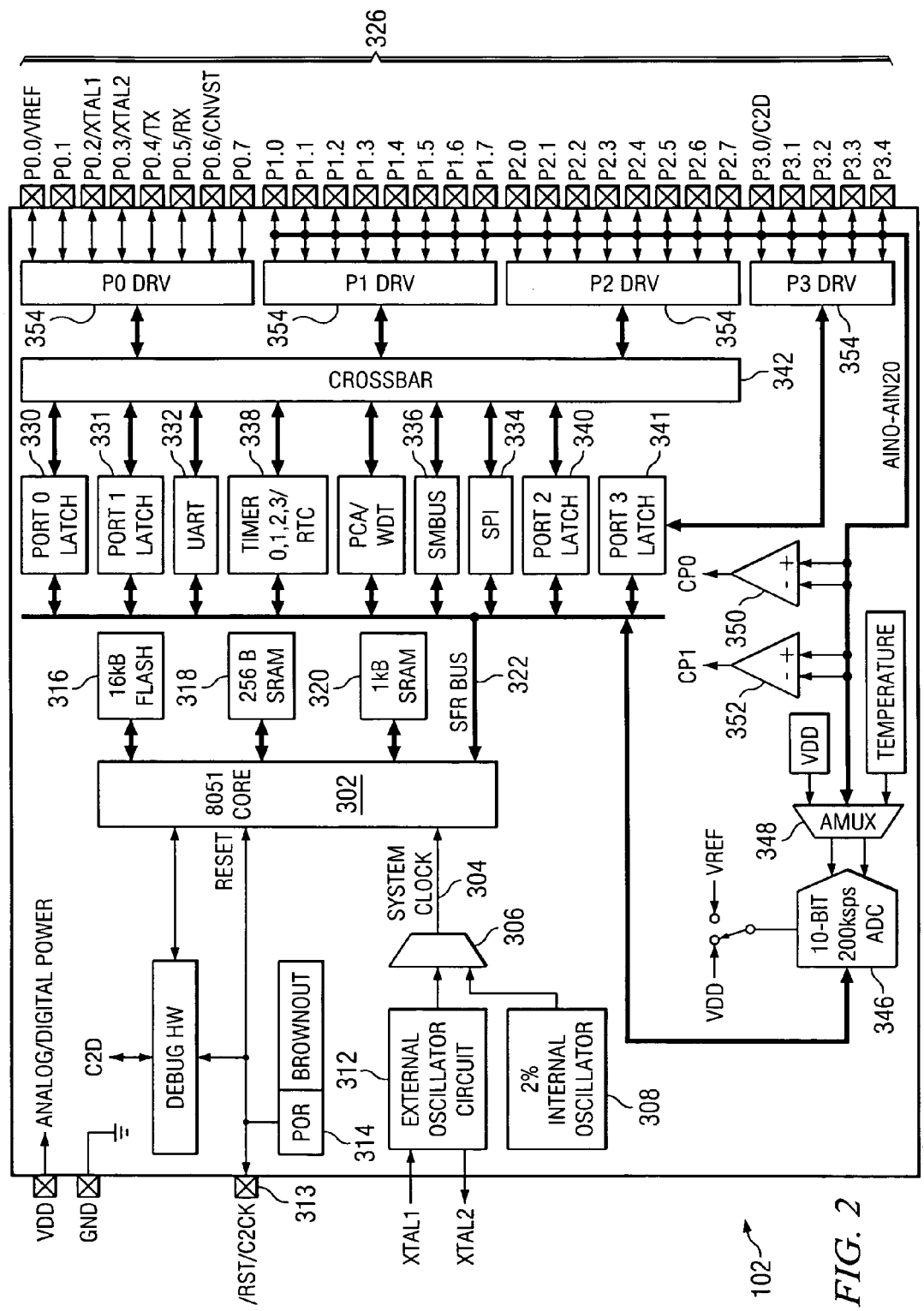
FIG. 2 is a functional block diagram of the micro controller unit of the sensorless, brushless DC motor.

Referring now to FIG. 2, there is more particularly illustrated a functional block diagram of the micro controller unit 102. This is a conventional operation of, for example, a part No. C8051F310 manufactured by Silicon Laboratories, Inc. The MCU 102 includes in the center thereof a processing core 302 which is typically comprised of a conventional microprocessor of the type "8051." The processing core 302 receives a clock signal on line 304 from a multiplexer 306. The multiplexer 306 is operable to select among multiple clocks. There is provided a 2% internal oscillator 308, and an external oscillator circuit 312. The processing core 302 is also operable to receive an external reset on terminal 313 or is operable to receive the reset signal from a power on reset block 314, both of which provide a reset to processing core 302. This will comprise one of the trigger operations.

The processing core 302 has associated therewith a plurality of memory resources, those being either flash memory 316, SRAM memory 318 or RAM memory 320. The processing core 302 interfaces with various digital circuitry through an on-board digital bus 322 which allows the processing core 302 to interface with various operating pins 226 that can interface external to the chip to receive digital values, output digital values, receive analog values, or output analog values. Various digital I/O circuitry are provided, these being latch circuitry 330 and 331, serial port interface circuitry, such as a UART 332, an SPI circuit 334 or an SMBus hereafter SMBUS interface circuit 336. Five timers 338 are provided in addition to additional latch circuits 340 and 341. All of the circuitry 330–341 is interfacable to the output pins 326 through a crossbar device 342, which is operable to configurably interface these devices with select ones of the output pins 326. The digital inputs/outputs can be interfaced to a digital output of an analog-to-digital converter 346 that receives analog input signals from an analog multiplexer 348 interfaced to a plurality of the input pins on the integrated circuit. The analog multiplexer 348 allows the multiple outputs to be sensed through the pins 326 such that the analog-to-digital converter 346 can be interfaced to various sensors. A pair of comparators 350 and 352 have their inputs interfaced to a plurality of the input pins 326 of the integrated circuit. The operating pins 326 are each driven by a number of pin drivers 354.

Referring now to FIG. 3, there is illustrated a general functional block diagram of the single digital control loop for controlling the sensorless, brushless DC motor 380 of the present invention. During operation, the DC motor 380 generates a back-EMF 382 (electromotive force). The back-EMF is a voltage developed in a motor winding by a moving magnetic field. The polarity of the voltage is at each instant opposite that of the generated or applied voltage. The back-EMF voltage 382 is measured within the micro controller unit 102 of the DC motor 380 and provided as a digital value to a PI controller 384. The PI controller 384 uses the measured back EMF voltage 382 to generate an error signal 386 indicating the amount which the DC motor 380 is operating away from an ideal condition. The error signal 386 and speed command 390 used by the micro controller unit 102 of the DC motor 380 to implement speed-dependent-voltage limiting 308 that alters the voltage V and speed ω of the DC motor to approach the ideal operating conditions as will be more fully described herein below.

Most sensorless, brushless DC motors use a three-phase bridge to drive the motor windings. One common method uses block commutation and an applied PWM signal to the bottom transistors of the winding. Depending upon the position of the motor and the Hall-Effect code, the appropriate step pattern is applied to the motor. As the motor rotates the step pattern will increment through various states.

However, a better approach to measuring the back-EMF voltage involves the use of a symmetric PWM scheme as illustrated in FIG. 4. A symmetric PWM scheme uses a system wherein active top and bottom transistors are turned on and off together. The simplest method for accomplishing this is to apply identical PWM signals to the top and bottom transistors in the manner indicated in FIG. 4. Thus, in state "0" a PWM signal is applied to the top transistor of the phase B and to the bottom transistor of phase A. This enables the back-EMF voltage to be measured on the open phase C. Likewise, in state "1," the PWM signal is applied to the top transistor of the phase C and to the bottom transistor of phase A. In this case, the back-EMF voltage may be measured at the open phase B. This process continues in similar manner through states 2–5 with the PWM signal being applied to the top and bottom transistors of two of the phases of the windings of the three-phase motor and the back-EMF voltage measurements being taken on the open third phase.

Figure 5B:
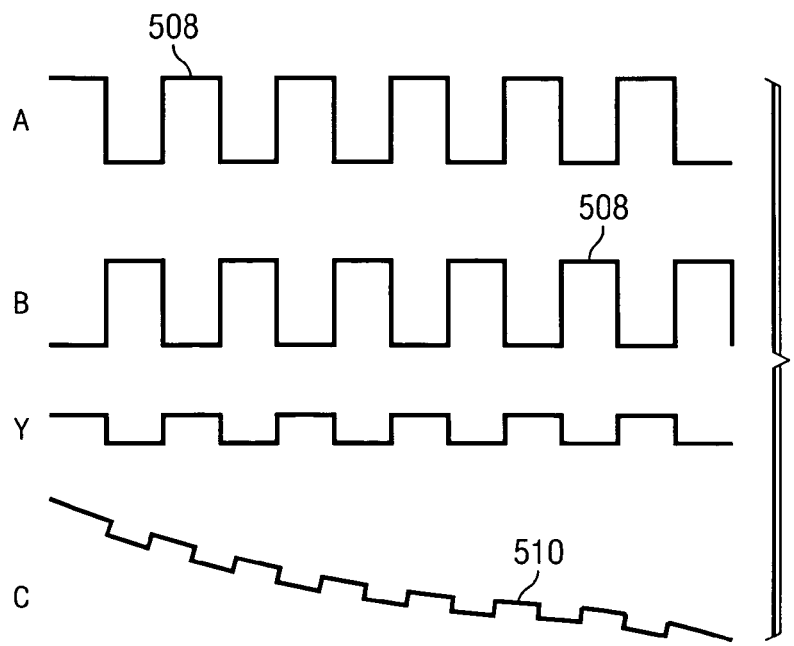
FIG. 5b illustrates measurement of the back-EMF from an open phase of a three-phase winding.

FIG. 5a illustrates a three-phase winding of the DC motor including phase A, phase B and phase C. The winding 5n02 for phase A resides between point A and point Y. The winding 504 for phase B resides between node B and node Y and the winding 506 for phase C resides between node C and node Y. FIG. 5a illustrates state 0 of the table of FIG. 4. A PWM signal is applied to the bottom transistor of phase A and to the top transistor of phase B. This leaves the open phase as phase C. The application of the PWM signal in this manner is more clearly illustrated in FIG. 5b. An identical PWM signal 508 is applied to both the A phase bottom transistor and the B phase top transistor. The result is that phase A will go low when phase B goes high and vice versa. If the A and B windings are balanced, the center point Y will remain mid-rail even though phase A and phase B are being pulse-width modulated. The voltage on phase C is now roughly equal to the back-EMF voltage. There may be some residual PWM noise due to the second order effects of unbalanced windings and capacitive coupling. However, the unwanted PWM signal is reduced by at least an order of magnitude from a non-symmetric PWM scheme, such as a low side PWM commutation scheme. The open phase measurements are taken from nodes 178, 184 and 190 (FIG. 1) of the DC motor by the ADC 346 and the micro controller unit 102 for use in the feedback control operation of the DC motor 102.

Most sensorless, brushless DC motor control systems use the back-EMF zero-crossing time as a control variable for a phase locked loop. The present system, instead of using the zero-crossing time, measures the back-EMF voltage at the middle of the commutation period using the ADC 346 of the micro controller unit 102 and uses this voltage measurement to generate an error signal controlling the commutation. This method provides higher resolution and always provides a robust feedback signal even as the DC motor 102 approaches a stall condition.

Figure 6A:
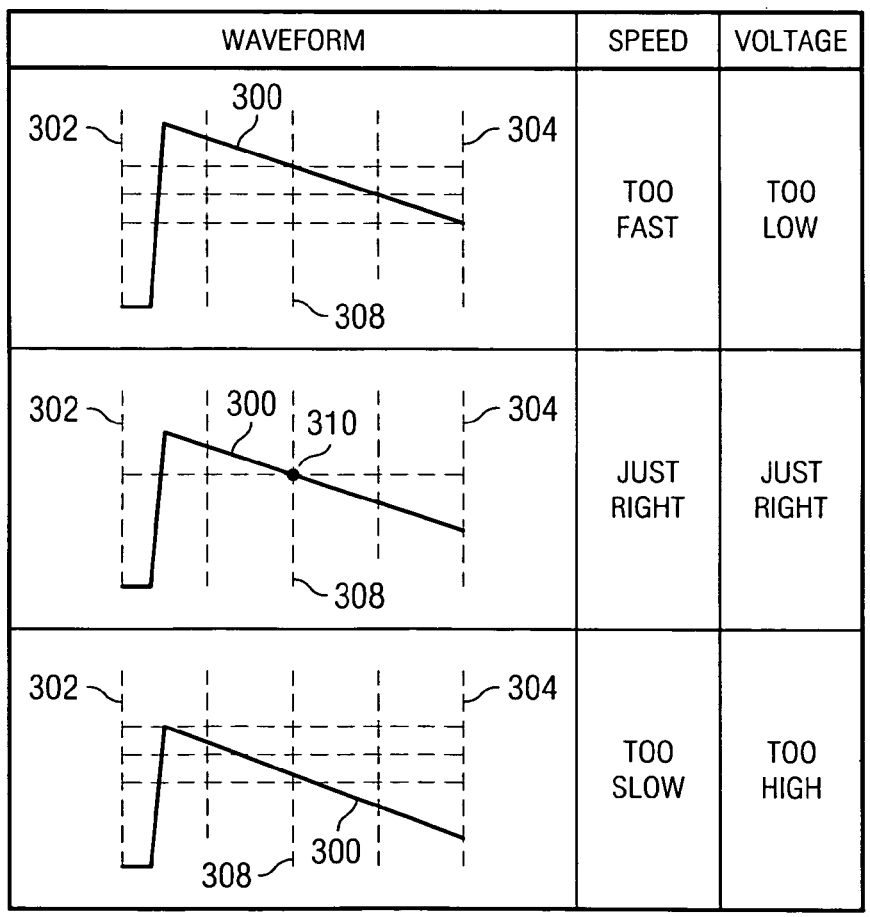
FIG. 6a illustrates the manner in which speed and voltage are affected by various back-EMF voltage conditions.

Referring now to FIG. 6a, there are illustrated three different cases of the back-EMF voltage measurements. Line 602 in each of the three examples illustrates the end of a previous commutation period and line 604 represents the beginning of a next commutation period. Determinations of errors in the speed and voltage of the DC motor may be made by measuring the back-EMF voltage 606 at the center point 608 between the two commutation periods. The first situation indicates a condition wherein either the speed of the DC motor is too fast or the voltage of the DC motor is too low. In this case, the voltage ramp of the back-EMF voltage 606 will be shifted up and to the right. The second example indicates a situation wherein both the speed and voltage of the DC motor are just right. In this case, the voltage ramp of the back-EMF voltage 606 between the commutation periods at the mid-point voltage point 610 will measure half of the rail supply. If the voltage of the DC motor is too high or the speed of the DC motor is too slow, the voltage ramp of the back-EMF voltage 606 will be shifted down and to the left. Thus, by determining the position of the voltage ramp representing the back-EMF voltage 606 a determination of the condition of the speed and voltage of the DC motor may be made.

Since there will be some distortion in the back-EMF voltage, over sampling and averaging may be used to compensate for the distortion. The PWM frequency for an 8-bit PWM is 24 KHz. The ADC 346 of the micro controller unit 102 can sample the back-EMF voltage eight times during one PWM period. Each of the ADC 346 samples are added together and divided by four to determine the back-EMF voltage at the center point 300, thus providing one additional bit of resolution.

Figure 6B:
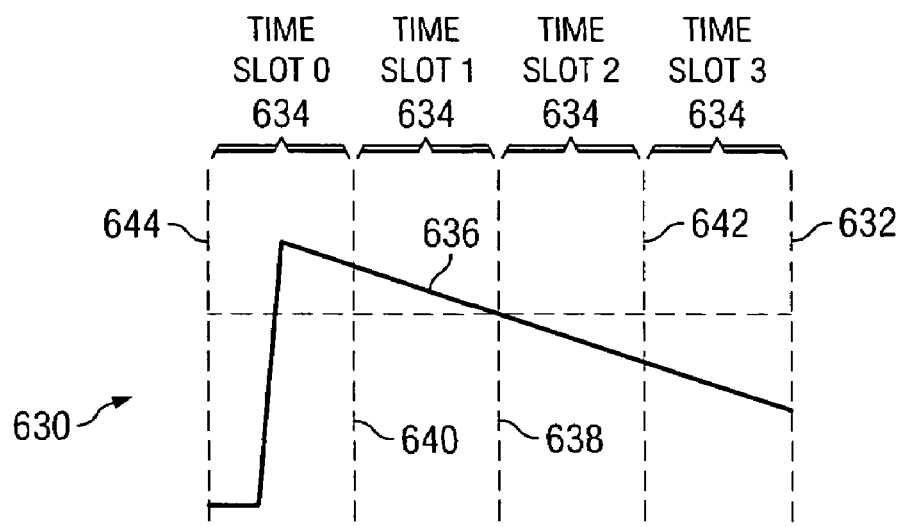
FIG. 6b illustrates the manner in which the back-EMF voltage on the open phase of the three-phase winding is sampled.

Referring now to FIG. 6b, there is illustrated the manner in which the back-EMF voltage is measured between commutation periods. Each period between a first commutation period 630 and a second commutation period 632 are divided into four time slots 634. The EMF voltage ramp 636 is sampled at three points by ADC 346. At the mid-point 638, the back-EMF voltage ramp is sampled to determine the EMF voltage for use with the control loop. The two back-EMF voltage measurements made at 640 and 642 are used for stall detection of the motor. A current measurement is made at 644 to use for current detection.

Stall detection is achieved by measuring the back-EMF voltage at quarter points over two cycles. The difference between the minimum and maximum of these four points is an indication of the back-EMF of the motor. If the back-EMF is greater than a certain value, a determination may be made that the motor is running. If the back-EMF is too small to gather a useful measurement, a determination as to whether the motor is stalled or running may not be made. Thus, the stall detection operates only on the running phase.

Figure 7:
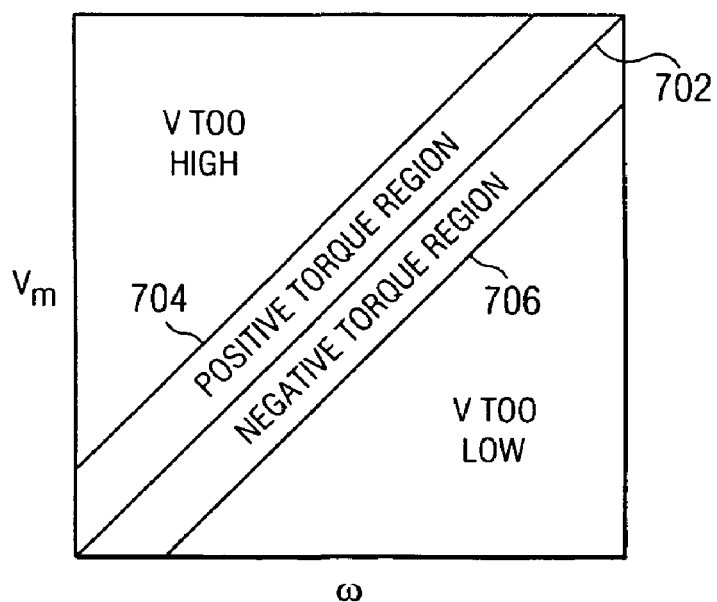
FIG. 7 illustrates the various regions of operation of a sensorless, brushless DC motor.

Referring now to FIG. 7, there is illustrated the various operating conditions of a sensorless, brushless DC motor with respect to the variables of motor voltage $V_M$ and motor speed $\omega$. When driving a sensorless, brushless DC motor from a micro controller unit 102, there are two output variables from the micro controller unit 102, the motor voltage $V_M$ and the motor speed $\omega$. FIG. 7 illustrates the output voltage versus speed characteristics of a sensorless, brushless DC motor. Three lines are illustrated. The middle line 702 is the ideal "no-load" line and is represented by the equation $V_M = K_E \cdot \omega$, wherein $K_E$ = the motor constant. This line represents the optimum voltage for a perfect motor with no friction. Maximum current is normally limited by the capability of the power transistors. The maximum boost voltage is the maximum inverter current ($I_{MAX}$) multiplied by the winding resistance ($R_W$). The upper line 704 is the ideal voltage plus the maximum boost voltage. This line defines the upper bounds for safe operation of the DC motor according to the equation $V = K_E \cdot \omega + I_{MAX} \cdot R_W$. The lower line 706 is the ideal voltage minus the maximum boost voltage and is represented by the equation $V = K_E \cdot \omega - I_{MAX} \cdot R_W$. This line defines the minimum bounds for safe operation of the DC motor.

The safe operating area for a sensorless, brushless DC motor resides between the maximum line 704 and the minimum line 706 of FIG. 7. Above the maximum line 704 the operating voltage for the DC motor is dangerously high. Below the minimum line 706, the operating voltage of the DC motor is dangerously low. Operation in either of these areas can damage the DC motor. The area between the ideal line 702 and the maximum line 704 is the positive torque region. In normal steady state operation, the output variables will operate in the positive torque region. The area below the ideal line 702 and above the minimum line 706 is the negative torque region. While most simple fan and pump applications do not require negative torque, operation of the DC motor in the negative torque region is permitted. If the motor speed command is decreased, the control system will output values in the negative torque region until the operating point is restabilized. While it is possible to prohibit operation in the negative torque region, this may adversely affect the stability of a control system.

Figure 8:
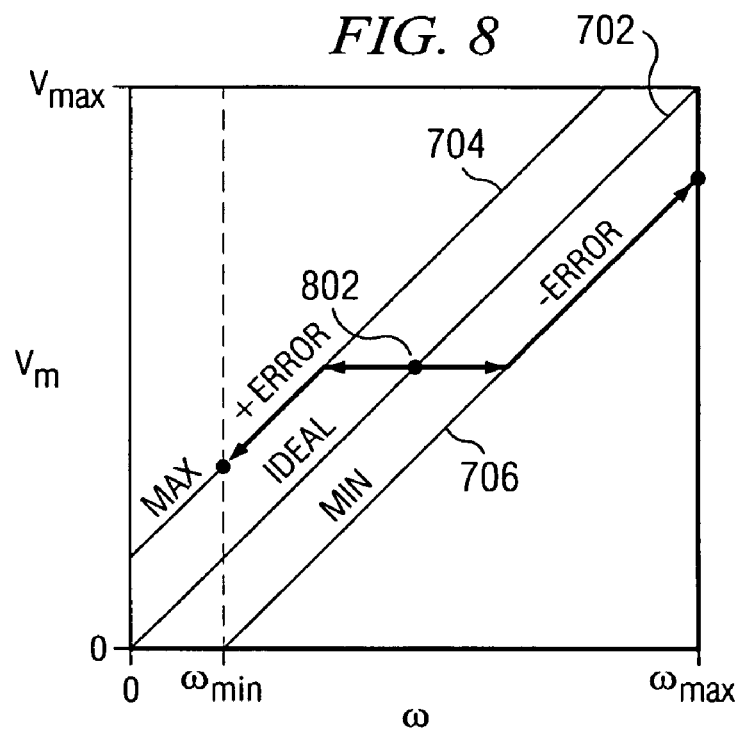
FIG. 8 illustrates the use of constant voltage control with speed dependent limiting as a manner of controlling operation of a sensorless, brushless DC motor.

In order to maintain the operation of the DC motor within the safe operating region lying between lines 704 and 706, a constant voltage control with speed dependent limiting control technique as illustrated in FIG. 8 is used. This control system uses a single control loop using digital data to maintain the output speed and voltage of the DC motor within the safe operating area between max-line 704 and mid-line 706. The input speed controlled potentiometer 112 (FIG. 1) under control of the micro controller unit 102 controls the target operating point 802 indicated by the dot on the ideal line 702. If the error signal is zero a determined by the back-EMF voltage, the output voltage and speed are set according to the speed potentiometer 112. As the speed control is varied, the target operating point 802 will vary along the ideal line 702.

The bold line indicates variations in the output voltage and speed due to the error signal generated by the MCU 102 in response to the measured back-EMF voltage. A small positive error signal from the feedback control system will result in the MCU 102 causing the potentiometer 112 decreasing the speed while the voltage remains constant. The voltage will remain constant until the speed reaches the limits set by the maximum line 704. If the error signal is large enough to exceed the maximum limit, both voltage and speed are reduced by the MCU 112 according to the maximum limit. Similarly, a small negative error signal will result in the MCU 102 causing the potentiometer 112 to increase the speed $\omega$. If the negative error increases beyond the bounds set by the minimum line 706, both the voltage and speed will be increased.

The resulting control loop is very stable and is implemented in a PI controller within the MCU 102. The DC motor is driven with a constant voltage so long as the load torque and acceleration are within the bounds set by the minimum and maximum limits. In this region, the motor behaves like a DC motor with a constant voltage drive. A small increase in load torque will result in a small decrease in speed. For large positive error signals, the motor voltage is reduced to keep the current below the maximum limits. In this region, the motor behaves as a constant current or constant torque drive. For large negative errors, the motor voltage is increased along with the motor speed to keep the current above the minimum limits.

The ADC 346 generates a digital signal representing the back EMF voltage and the PI controller 385 generates an error signal from the back EMF voltage. The input potentiometer 388 (FIG. 3) controls the voltage level in corresponding no-load speed. As the error signal from the P/I controller 385 increases, the speed will both decrease and the voltage will remain constant until The voltage reaches the max line 704. If the error signal keeps increasing, the voltage and speed will decrease. As the error signal from the P/I controller 385 decreases, the speed will increase and the voltage will remain constant until the voltage reaches the min line 706. If the error keeps decreasing, the voltage and speed will both increase.

Figure 9:
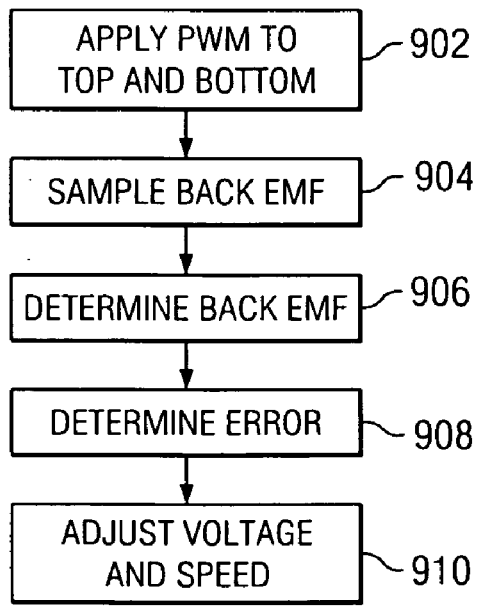
FIG. 9 is a flow diagram illustrating the operation of the control loop of the present invention.

Referring now to FIG. 9, there is illustrated a flow diagram describing the operation of the control system of the present disclosure. Initially, at step 902, a PWM signal is applied to the top and bottom transistors of two of the phases of a three-phase DC motor according to one of the states described with respect to FIG. 4. Next, the ADC 346 of the micro controller unit 102 samples the back-EMF voltage at step 904 to determine an average value at step 906. Using the determined back-EMF voltage, a P/I controller will determine an error in the speed and/or voltage of the DC motor at step 908 and generate an error signal indicative thereof. The error signal is used by the MCU and the potentiometer to adjust the speed and/or voltage of the DC motor at step 910. The process will then repeat itself to continue to maintain the voltage and speed of the DC motor as close as possible to ideal conditions.

Although the preferred embodiment has been described in detail, it should be understood that various changes, substitutions and alterations can be made therein without departing from the spirit and scope of the invention as defined by the appended claims.

What is claimed is:

1. A processor for controlling a sensorless, brushless DC motor, comprising:
   a first output for providing a control signal to a potentiometer controlling a speed and voltage of the DC motor;
   a first input for receiving a back EMF voltage from an open phase of a three phase winding; and
   wherein the processor is configured to determine a digital error signal from the back EMF voltage and generate the control signal responsive to the digital error signal, the control signal decreasing the speed when the digital error signal is in a first region, decreasing the speed and the voltage when the digital error signal is in a second region, increasing the speed when the digital error signal is in a third region, and increasing the speed and the voltage when the digital error signal is in a fourth region.

2. The processor of claim 1, further including an A\D converter for measuring a value of the EMF voltage at a first point.

3. The processor of claim 2, wherein the A\D converter measures the value of the EMF voltage by sampling the back EMF voltage a plurality of times and taking an average of the plurality of samples.

4. The processor of claim 1, wherein the digital error signal is generated in the first region or the second region if the EMF voltage is below a predetermined voltage.

5. The processor of claim 1, wherein the error signal is generated in the third region or the fourth region if the EMF voltage is above a predetermined voltage.

6. The processor of claim 1, further including a PI controller for generating the digital error signal responsive to the back EMF voltage.

7. The processor of claim 1, wherein the first region error corrected voltage is greater than a maximum permissible voltage for a particular motor speed.

8. The processor of claim 1, wherein the fourth region error corrected voltage is less than a minimum permissible voltage for a particular motor speed.

9. A sensorless, brushless DC motor, comprising:
first circuitry for measuring a back EMF voltage of the sensorless, brushless DC motor from an open phase of a three phase winding;
a potentiometer for controlling a speed and voltage of the sensorless, brushless DC motor responsive to a digital error signal; and
a processor for generating the digital error signal from the back EMF voltage, the digital error signal decreasing the speed when the digital error signal is in a first region, decreasing the speed and the voltage when the digital error signal is in a second region, increasing the speed when the error signal is in a third region, and increasing the speed and the voltage when the digital error signal is in a fourth region.

10. The sensorless, brushless DC motor of claim 9, wherein the processor further includes an A\D converter for measuring a value of the EMF voltage at a first point.

11. The sensorless, brushless DC motor of claim 10, wherein the A\D converter measures the value of the EMF voltage by sampling the back EMF voltage a plurality of times and taking an average of the plurality of samples.

12. The sensorless, brushless DC motor of claim 9, wherein the digital error signal is generated in the first region or the second region if the EMF voltage is below a predetermined voltage.

13. The sensorless, brushless DC motor of claim 9, wherein the digital error signal is generated in the third region or the fourth region if the EMF voltage is above a predetermined voltage.

14. The sensorless, brushless DC motor of claim 9, wherein the processor further includes a PI controller for generating the digital error signal responsive to the back EMF voltage.

15. The sensorless, brushless DC motor of claim 9, wherein the first circuitry further includes:
first and second transistors associated with each phase of the sensorless, brushless DC motor;
drivers for driving each of the first and second transistors.

16. The sensorless, brushless DC motor of claim 9, wherein the processor further applies a PWM signal to two of three phases of the sensorless, brushless DC motor and measures the back EMF voltage from a third phase of the three phases.

17. The processor of claim 9, wherein the first region error corrected voltage is greater than a maximum permissible voltage for a particular motor speed.

18. The processor of claim 9, wherein the fourth region error corrected voltage is less than a minimum permissible voltage for a particular motor speed.

19. A system, comprising:
a sensorless, brushless DC motor; and
a digital control loop connected to the a sensorless, brushless DC motor for measuring a back EMF voltage of the sensorless, brushless DC motor from an open phase of a three phase winding, generating a digital error signal from the back EMF voltage and controlling a speed and voltage of the sensorless, brushless DC motor responsive to the digital error signal, the digital error signal decreasing the speed when the digital error signal is in a first region, decreasing the speed and the voltage when the digital error signal is in a second region, increasing the speed when the error signal is in a third region, and increasing the speed and the voltage when the digital error signal is in a fourth region.

20. The system of claim 19, wherein the processor further includes an A\D converter for measuring a value of the EMF voltage at a first point.

21. The system of claim 20, wherein the A\D converter measures the value of the EMF voltage by sampling the back EMF voltage a plurality of times and taking an average of the plurality of samples.

22. The system of claim 19, wherein the digital error signal is generated in the first region or the second region if the EMF voltage is below a predetermined voltage.

23. The system of claim 19, wherein the digital error signal is generated in the third region or the fourth region if the EMF voltage is above a predetermined voltage.

24. The system of claim 19, wherein the control loop further includes a PI controller for generating the digital error signal responsive to the back EMF voltage.

25. The system of claim 19, wherein the control loop further includes a potentiometer for controlling the speed and the voltage of the sensorless, brushless DC motor responsive to the digital error signal.

26. The processor of claim 19, wherein the first region error corrected voltage is greater than a maximum permissible voltage for a particular motor speed.

27. The processor of claim 19, wherein the fourth region error corrected voltage is less than a minimum permissible voltage for a particular motor speed.

* * * * *